United States Patent Office 3,290,174
Patented Dec. 6, 1966

3,290,174
TWO-STAGE PROCESS FOR DERUSTING AND PROTECTING THE SURFACES OF FERROUS MATERIALS
Earl W. Kendall, San Diego, Calif., assignor to Rohr Corporation, a corporation of California
No Drawing. Original application Oct. 9, 1961, Ser. No. 143,524. Divided and this application Dec. 28, 1964, Ser. No. 430,785
1 Claim. (Cl. 134—3)

This application is a division of my copending application for Multi-Purpose Compositions and Processes for Treating Metals and Metal Alloys, Serial No. 143,524, filed October 9, 1961, now abandoned, and the latter application is a continuation-in-part of my patent application, Serial No. 709,442, filed January 17, 1957, for Process and Composition for Treating Aluminum Alloys, now Patent No. 3,003,896.

This invention relates to multi-purpose compositions and processes for treating metals and metal alloys to provide an exposed surface thereon which is clean and substantially free from metallic oxides.

In the manufacture of many aircraft assemblies it is cutomary to electrically weld or braze two or more sheet metal parts together which are made of metals or alloys of metals. It has been found that thin films of oil, dirt and/or metallic oxides on the faying surfaces of aluminum parts obstruct the passage of the electric current to cause poor welds, or these contaminants on stainless steel materials prevent proper bonding of the braze alloy to the base materials to thus result in imperfect brazing of such materials. It has also been found that the presence of foreign matter or oxides on the faying surfaces of aluminum parts to be welded together causes the electrical surface resistance to increase markedly and that to secure spot welds of high strength, the surface or contact resistance between the parts should not exceed 100 microhms. It is frequently necessary, moreover, to remove oxides in preparation for the application of coatings to the treated material as in the case of ferrous materials from the surfaces of which rust must be removed preparatory to the application of a protective coating such, for example, as a phosphate coating.

It is therefore an object of my invention to provide new and improved compositions and methods for treating various metals and metal alloys to remove thin films of oil, dirt and/or metallic oxides from the surfaces of such materials.

It is a main object of my invention to provide a method for treating alloys having a high aluminum content which will remove all surface dirt therefrom and also remove any oxide film present on their surfaces.

A further object is to provide such a treatment which leaves the surface of commercial aluminum alloy sheet so smooth and glossy that it has a pleasing appearance and reflects light well.

Another object is to provide a treatment of the type described which is effective on aluminum alloys of many different chemical compositions.

A still further object in a treatment of the type described is to provide etching compositions which may be placed in aqueous solution for the purpose of treating alloys as aforedescribed.

Another object is to provide new and improved compositions and methods for cleaning and deoxidizing stainless steel honeycomb and skin materials preparatory to brazing the same together to form honeycomb core sandwich panel structures.

Another object is to provide a two-stage process operable at ambient temperature for cleaning stainless steel materials, as in the foregoing, and wherein the first stage solution serves as a cleaner and the second stage solution serves to remove the oxide film found on stainless steels.

Still another object is to provide a new and improved composition for cleaning and deoxidizing stainless steel in a single-stage process.

Yet another object is to provide a new and improved composition and process for derusting ferrous materials such as black iron preparatory to applying a phosphate coating thereto.

Still a further object is to provide a composition and process for derusting the surfaces of ferrous materials while also applying a protective coating thereto which will remain on the treated surfaces for extended periods and prevent recurrent rusting.

Additional objects will become apparent as the description proceeds.

In treating sheets of aluminum-rich alloys which are to be spotwelded together, the sheets as they come from the mill are first immersed in or treated with the vapor of trichloroethylene, ethylene dichloride or other known organic solvent to remove any oil or grease film on their surface. The sheets are next cleaned with an inhibited alkaline cleaner and rinsed with mineral-free water. Next the sheets are immersed for from 3 to 5 minutes in an aqueous solution of the composition:

| | Percent by weight |
|---|---|
| Nitric acid ($HNO_3$) | 15 to 25 |
| Chromic acid ($CrO_3$) | 0.5 to 1.5 |
| Water | Balance | the optimum content of nitric acid being approximately 22 percent. It is not necessary to heat this solution since it is effective within the temperature range of 70° to 90° F. The chromic acid acts as a passivating agent to somewhat inhibit the etching action of the nitric acid. This solution performs several functions in that it:

(1) Removes small particles of foreign metal which have become embedded in the surface of the sheet during the manufacturing process.

(2) Removes certain oxide and scale formations resulting from previous heat treatment or other exposure to elevated temperature.

(3) It brightens the surface of the sheet somewhat yet the specular gloss already present is not destroyed.

(4) It conditions the metal surface so that a more uniform action is secured in a deoxidizing medium described below.

(5) The solution has substantially no etching action on the aluminium alloy composing sheet.

The sheets are rinsed with mineral-free water and then deoxidized in a solution of the composition:

| | | |
|---|---|---|
| Citric acid $H_3 \cdot C_6H_5O_7$ | ounces | 1 to 3 |
| Ammonium bifluoride $NH_4F \cdot HF$ | do | 0.1 to 0.5 |
| Mineral-free water | gallon | 1 |

The proportions given for the citric acid ammonium bifluoride represent dry chemicals ranging from two to thirty parts by weight of citric acid to one part by weight of ammonium bifluoride.

Preferably 2 ounces of the citric acid and 0.1 ounce of ammonium bifluoride are used per gallon of water. Immersion in the solution for from 1 to 5 minutes at a temperature between 70° to 90° F. dissolves the oxides on the surface of the sheets. The citric acid acts as a buffer and also as a cleaning agent or desmutter, the ammonium bifluoride being the motive etching agent. Ammonium bifluoride is to be taken as exemplary of soluble fluoride salts suitable for the purpose. The citric acid, like other water soluble carboxylic acids, serves as an organic reducing agent to prevent formation of oxides on the surface of the sheets. The citric acid, as a buffer serves to inhibit somewhat the etching action of the ammonium bifluoride whereby the immersion time may be several minutes as aforenoted. This solution thus dissolves and removes any oxide film of aluminum and other metals composing the alloy.

The sheets are next thoroughly rinsed in mineral-free water and then immersed in the aforedescribed bath of nitric and chromic acids for from 2 to 3 minutes. This solution dissolves small dark particles of smut which may have formed on the sheets while in the ammonium bifluoride etch and leaves the surface of the sheets clean and free of oxides.

The sheets are now thoroughly rinsed with mineral-free water and dried in an oven or by other known means at a temperature not over 110° F. It will be noted that this process requires the use of no heated baths, both the chemical solutions and all the rinse water preferably being at normal room temperature of about 70° F. but in no event higher than 90° F. The process leaves the surface of the sheets very smooth and with such a high gloss that it reflects incident light well. The electrical resistance at the surface of the sheets is less than 5 microhms. The process produces a sheet surface which is acceptable for electrical spot or seam welding, anodizing, alodizing and other chemical conversion treatments.

The process is effective with the following widely used aluminum alloys in all physical conditions and having the approximate compositions noted in percent by weight:

|         | Type 2024  | Type 5052  | Type 6061  | Type 7075            |
|---------|------------|------------|------------|----------------------|
| Cu      | 3.8 to 4.9 | 0.1        | .15 to .40 | 1.2 to 2.0           |
| Mn      | 0.3 to 0.9 | 0.1        | .15        | 0.3                  |
| Mg      | 1.2 to 1.8 | 2.2 to 2.8 | 0.8 to 1.2 | 2.1 to 2.9           |
| Cr      | 0.25       | .15 to .35 | .35        | .15 to .40           |
| Zn      | 0.1        | 0.1        | .2         | 5.1 to 6.1           |
| Fe+Si   | 0.5        | 0.45       | 1.1        | 1.2                  |
| Al      | balance    | balance    | balance    | Ti 0.2<br>Al balance |

It is not necessary to segregate sheets of the above compositions under my process but all the sheets may be processed simultaneously, thus saving the operator's time in sorting out sheets of the same composition and processing each lot separately.

The deoxidizing composition thus far described thus comprises a cold aqueous solution for reducing the surface electrical resistance of aluminum-rich alloys below 5 microhms and in which the chemical constituents in the solution, namely, citric acid and ammonium bifluoride, are in specified proportions, these proportions being such that the ammonium bifluoride, in solution, produces hydrofluoric acid in such strength that this acid, in the absence of the citric acid in the solution, would deleteriously attack and etch the aluminum. The citric acid, however, is in sufficient dominating proportion in the solution to act as a buffer to thus inhibit and limit the etching action of the hydrofluoric acid and thereby control the time required to remove the oxides to the extent necessary to reduce the surface electrical resistance below the specified 5 microhms. The citric acid because of its low disassociation in the cold solution does not act as an etch, but the disassociation is sufficient to effect the buffering action. To accomplish these effects of the hydrofluoric acid as an etch and the citric acid as a buffering agent, the citric acid and ammonium bifluoride comprise about 1 to 3 ounces and about 0.1 to 0.5 ounce, respectively, in a gallon of water or, as otherwise specified, the citric acid ranges from about 2 to 30 parts by weight to 1 part by weight of the ammonium bifluoride. As set forth in process terms, to accomplish the specified surface resistance reduction, the temperature of the solution is maintained at from 70° to 90° F. and the alloys being treated are subjected to an immersion time in the solution of from 1 to 5 minutes.

In view of the highly aqueous form of the ultimate solution, the ammonium bifluoride and citric acid composition preferably is manufactured and sold in the form of a concentrate having the following formulation:

Ammonium bifluoride _____ grams__ 24
Citric acid _____ grams (hydrous) __ 420
Water _____ mls__ 400
Total volume _____ mls__ 690

In the formation of the concentrate, substantially the full limit of solubility of the citric acid in water is utilized, the ratio of solubility being approximately 1 to 1.3. The commercially available hydrous form of the citric acid preferably is used and, hence, allowance is made for the water content of the citric acid, the actual citric acid content being about 384 grams. A commercial grade of ammonium bifluoride known in the trade as MF acid, manufactured by the Wyandotte Chemical Corporation of Wyandotte, Michigan, is also preferred.

The ratio of ammonium bifluoride to citric acid is chosen within the afore-specified range of about 2 to 30 parts by weight of citric acid to one part by weight of ammonium bifluoride, the following specific ratio being preferred:

Ratio
Ammonium bifluoride, 24/690=.0348 g./ml. _____ 1
Citric acid, 384/690=.557 g./ml. _____ 16

The proportions of the constituents per milliliter of concentrate is then as follows:

Ammonium bifluoride, 24/690=0348 g./ml.
Citric acid, 384/690=.557 g./ml.
Water, 436/690=.632 ml./ml.

It will be understood that these constituent in these proportions per milliliter of concentrate may be marketed in 1 gallon lots, for example. In use in the ultimate prespotweld etch, approximately 2 to 5% of this concentrate per milliliter of solution is used, as follows:

2.5% × .0348 = .00087 g. ammonium bifluoride
2.5% × .557 = .0140 g. citric acid
2.5% × .632 = .0158 ml. water The ammonium bifluoride-citric acid concentrate may be used to advantage in a two-stage process to derust black iron or other ferrous materials and leave the treated surfaces with a citric acid coating which will protect the same against recurrent rusting over extended periods. To this end, the iron to be treated is first immersed for from 5 to 25.0 minutes, depending on the extent of the rust, in an aqueous solution consisting of 20% by volume of the concentrate and the remainder water and operated at from 175° to 185° F., this solution consisting per milliliter of solution, as follows:

SOLUTION NO. 1

Concentrate:
    20% × .0348 = .00696 g. ammonium bifluoride
    20% × .557 = .11140 g. citric acid
    20% × .632 = .12640 ml. water Remainder:
    80% × 1 = .8 ml. water Following immersion in Solution No. 1, the treated materials are rinsed in water and then immersed for from 0.5–1.0 minute in an aqueous solution consisting of 5% by volume of the concentrate and the remainder water and operated at ambient temperature, this solution consisting per milliliter of solution, as follows:

SOLUTION NO. 2

Concentrate:
    5% × .0348 = .00174 g. ammonium bifluoride
    5% × .557 = .02785 g. citric acid
    5% × .632 = .03160 ml. water Remainder:
    95% × 1 = .95 ml. water Ferrous materials treated in the foregoing manner are fully derusted and will retain this condition for a period of 2 to 3 months indoors and, if protected outdoors from direct contact with water, will resist recurrent rusting for from 1 to 3 weeks, this being due to the protective film of citric acid which is left on the surfaces following immersion in Solution No. 2, there being no water rinse following treatment in this solution. When derusted in this manner, the materials are suitably conditioned for application thereto of any one of several conventional phosphate coatings. To apply such a coating, the derusted materials are:

(1) Rinsed in warm water; and
(2) Run through the phosphate coating bath.

When the concentrate is added to certain other ingredients, the resulting solution may be used to advantage in cleaning stainless steel parts such, for example, as honeycomb core and skins preparatory to brazing the same together to form honeycomb sandwich panels. Such a solution may be operated at room temperature and have the following formulation:

*Single-stage solution composition*

| | Percent by volume |
|---|---|
| Triethylene glycol | 20 to 30 |
| Ethylene glycol monobutyl ether | 20 to 30 |
| Concentrate (citric acid-ammonium bifluoride) | 3 to 30 |
| Wetting agent (Triton X-155) | 5 to 10 |
| Water | Balance |

The use of the wetting agent is optional. If solution agitation is resorted to, use of the wetting agent is not recommended. When solution agitation is not available, the wetting agent should be used.

The single-stage solution composition serves a twofold purpose. It performs the function of both a cleaner and an oxide film remover. In preparing the solution, the citric acid-ammonium bifluoride concentrate should be dissolved in the balance of water to be added to the solution prior to adding the mixture of the two organic solvents.

In preparing the stainless steel parts for brazing, the same are first subjected to degreasing to remove the bulk of surface contaminants and then immersed in the single-stage solution for from 10 to 15 minutes. Upon removal from the solution, the parts are thoroughly rinsed with cold tap water; finally rinsed in demineralized or distilled water; and then force dried. The parts are then ready for brazing.

The citric acid-ammonium bifluoride concentrate may be used as the second solution in a two-stage process for preparing the honeycomb panel parts for brazing. To this end, the two solutions will have the following composition:

SOLUTION NO. 1

| | | |
|---|---|---|
| Triethylene glycol | percent by volume | 10 to 15 |
| Ethylene glycol monobutyl ether | do | 10 to 15 |
| Sodium hydroxide | percent by weight | 1 to 2 |
| Wetting agent (aryl alkyl polyether alcohol) | percent by volume | 2 to 5 |
| Water | | Balance |

SOLUTION NO. 2

| | Percent by volume |
|---|---|
| Concentrate (citric acid-ammonium bifluoride) | 3 to 30 |

The use of the wetting agent in Solution No. 1 is optional. In the absence of the wetting agent, agitation of the solution may be employed to disperse surface contamination to a greater extent.

Both solutions are operated at ambient or room temperatures, Solution No. 1 being a cold alkaline cleaner and Solution No. 2, of course, being a cold aqueous solution which, in accordance with the nature of the citric acid-ammonium bifluoride cleaning composition hereinvolved throughout this specification, serves to remove the oxide film found on stainless steels.

In preparing the stainless steel parts for brazing, the same are first subjected to degreasing as noted in connection with preparation for use of the single-stage process, and then immersed sequentially in the first and second solutions for a period of from 5 to 15 minutes in each. Rinsing must be adequate after treatment in each of the solutions.

An alternative two-stage process for cleaning stainless steel parts preparatory to brazing the same together may have the following formulations for the first and second solutions:

SOLUTION NO. 1

| | | |
|---|---|---|
| Monoethanolamine | percent by volume | 1 to 2 |
| Ethyl Cellosolve | do | 15 to 25 |
| Ethylenediaminotetracetic acid (EDTA-4Na) | percent by weight | 0.5 to 1.5 |
| Sodium metasilicate ($Na_2Si_3O_7$) | percent by volume | 4 to 8 |
| Nonionic wetting agent | do | 3 to 5 |
| Water (distilled or demineralized) | | Balance |

It will be understood that where, as in this formulation, and elsewhere throughout this specification, where a wetting agent is specified, the same is intended to be nonionic and selected from a group designated as the APPE series (alphaphenoxy polyethoxy ethanol) of which Triton X-100, Triton X-102, and Triton X-155 are examples. Another example of a nonionic wetting agent is the aforementioned aryl alkyl poly-ether alcohol.

SOLUTION NO. 2

| | Percent by volume |
|---|---|
| Concentrate (citric acid-ammonium bifluoride) | 3 to 30 |

In cleaning the stainless steel parts in this alternative two-stage process, the same are:

(1) Immersed in Solution No. 1, operated at room temperature, for from 10 to 15 minutes;
(2) Rinsed in cold water pressure spray;
(3) Immersed in Solution No. 2, operated at room temperature, for 10 to 15 minutes;
(4) Rinsed in a cold water pressure spray; and
(5) Hot air dried.

The cold alkaline cleaner used as Solution No. 1 in this alternative two-stage cleaning process to clean stainless steels may be used to clean other metals such as aluminum, magnesium, and titanium, the attack on aluminum being inhibited by the presence of the sodium metasilicate. This metal cleaner is a non-corrosive and non-flammable liquid well suited for the removal of oils, waxes, ink markings, and other soils upon immersion in the cleaner solution and followed by a cold water pressure rinse.

In the foregoing formulations where triethylene glycol is specified, this is intended as an example of a group of suitable water soluble glycols. Similarly, where ethylene glycol monobutyl ether is specified, this is intended as an example of a group of suitable water soluble Cellosolves such as ethyl Cellosolve.

Thus, the single-stage stainless steel cleaner composition may be expressed as:

| | Percent of volume |
|---|---|
| A water soluble glycol | 20 to 30 |
| A water soluble Cellosolve | 20 to 30 |
| A citric acid-ammonium bifluoride concentrate | 3 to 30 |
| Water | Balance |

The glycol and Cellosolve constitute a cleaner compatible in solution with the concentrate which serves as an oxide film remover. The formulation may thus be expressed as:

| | Percent of volume |
|---|---|
| A water soluble glycol-Cellosolve cleaner | 40 to 60 |
| A citric acid-ammonium bifluoride concentrate | 3 to 30 |
| Water | Balance |

In the formulation for the two-stage process the alkaline cleaner solution may be expressed as:

| | | |
|---|---|---|
| Water soluble glycol | percent by volume | 10 to 15 |
| Water soluble Cellosolve | do | 10 to 15 |
| Sodium hydroxide | percent by weight | 1 to 2 |
| Water | | Balance |

Where ambient temperature is specified herein, it will be understood that this refers to room temperature ranging from 65° to 110° F. It will further be understood that where water is specified as the balance in the various solution formulations, this is intended to mean distilled or demineralized water.

This invention may be embodied in other forms or carried out in other ways without departing from the spirit or essential characteristics thereof. The hereinbefore disclosed methods and compositions of the invention are therefore to be considered as in all respects illustrative and not restrictive, the scope of the invention being indicated by the appended claim, and all changes which come within the meaning and range of equivalency of the claim are intended to be embraced therein.

Having thus described my invention, what I claim as new and useful and desire to secure by Letters Patent is:

A two-stage process for derusting and leaving a protective citric acid film on ferrous materials consisting of the steps of immersing the materials for from 5 to 25 minutes in a first aqueous solution operated at from 175° to 185° F. and consisting of about 20% by volume of a citric acid-ammonium bifluoride concentrate and the balance water, rinsing in water, and immersing the material for from 0.5 to 1.0 minute in a second aqueous solution operated at ambient temperature and consisting of about 5% by volume of said concentrate and the balance water, said concentrate consisting per milliliter of concentrate of about .0348 gram ammonium bifluoride, about .557 gram of citric acid, and about .632 ml. of water.

References Cited by the Examiner

UNITED STATES PATENTS

| | | | |
|---|---|---|---|
| 2,414,293 | 1/1947 | Farrington et al. | 148—6.14 |
| 2,477,851 | 8/1949 | Arent | 148—6.14 |
| 2,558,013 | 6/1951 | Staubly et al. | 252—143 |
| 2,687,346 | 8/1954 | McDonald | 134—41 X |
| 2,942,956 | 6/1960 | Kelly | 134—41 X |
| 2,981,633 | 4/1961 | Davis et al. | 134—41 X |
| 3,003,896 | 10/1961 | Kendall | 134—3 |
| 3,019,194 | 1/1962 | Brite | 134—41 X |

MORRIS O. WOLK, *Primary Examiner.*

J. ZATARGA, *Assistant Examiner.*